Jan. 31, 1961

B. W. CARTER 2,969,717

HYDRAULIC SYSTEM FOR PATTERN CONTROLLED MACHINE TOOLS

Filed Nov. 10, 1958

INVENTOR.
BENJAMIN W. CARTER.
BY Howard S. Keiser,
& John F. Verhoeven
ATTORNEYS.

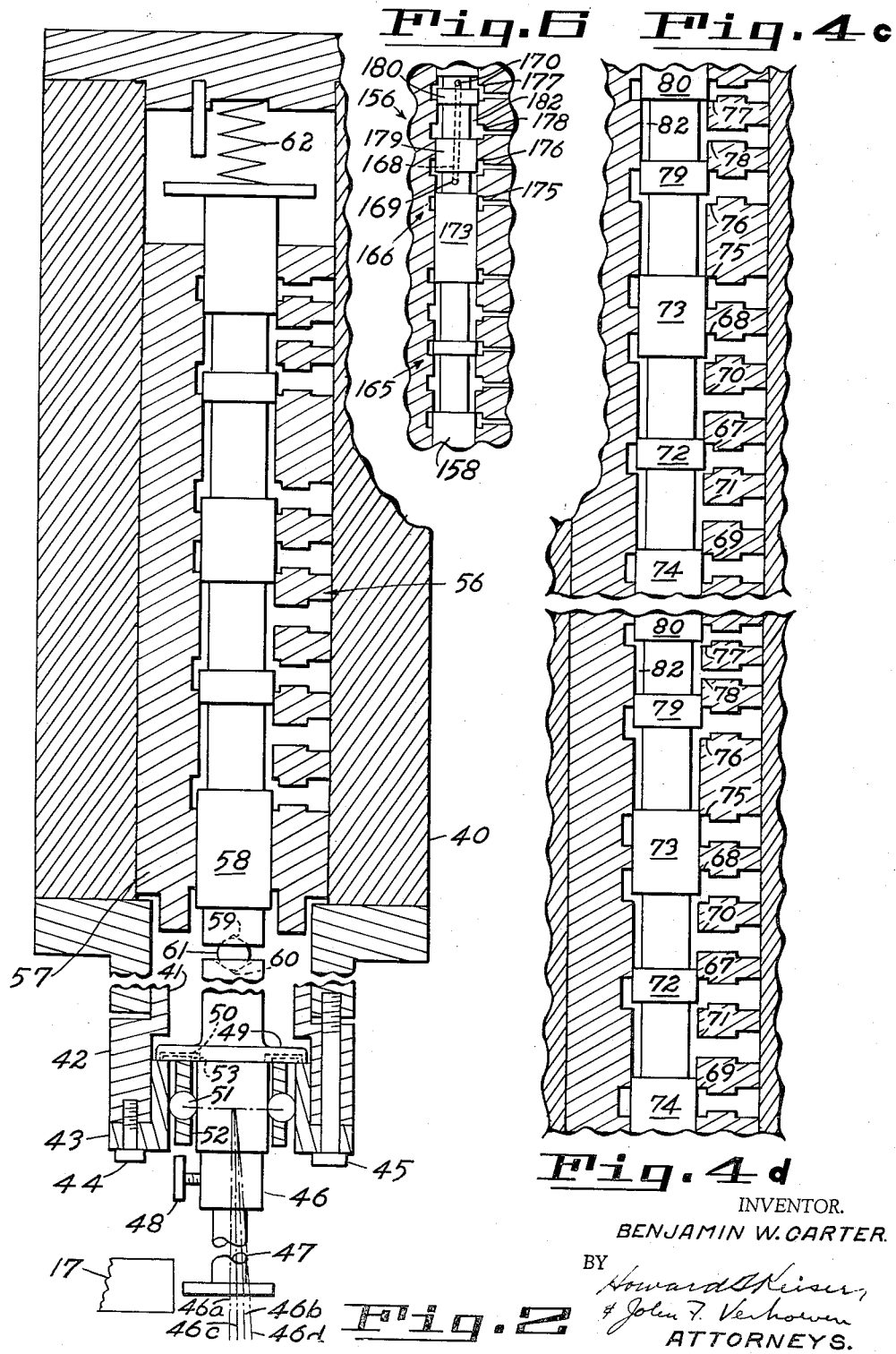

United States Patent Office 2,969,717
Patented Jan. 31, 1961

2,969,717

HYDRAULIC SYSTEM FOR PATTERN CONTROLLED MACHINE TOOLS

Benjamin W. Carter, Cincinnati, Ohio, assignor to The Cincinnati Milling Machine Co., Cincinnati, Ohio, a corporation of Ohio Filed November 10, 1958, Ser. No. 772,974

10 Claims. (Cl. 90—13.5)

The present invention relates to a hydraulic system for effecting two dimension tracing of more than 180 degrees but less than 360 degrees in a pattern controlled machine tool.

Tracer controlled machine tools capable of profile cutting through an angle greater than 180 degrees are not new, many of such machine tools, such as the one shown in U.S. Patent No. 2,332,533, issued to E. G. Roehm October 26, 1943, being capable of profiling through 360 degrees. The hydraulic system in machines of this sort, however, are relatively complicated and expensive. Generally, they require a motor driven in response to deflection of the follower to maintain the bias of the follower against the pattern and to operate the valves controlling the slides of the machine, or some similar mechanism to impart a directional characteristic to the tracer mechanism.

In many applications 360 degree tracing is not required but yet it is desired to cut a conformation in a workpiece through an angle greater than is possible with a conventional 180 degree tracer system. In the present invention there is provided a hydraulic system, not significantly more complicated than the conventional 180 degree system, with which this is possible.

In brief, the tracer valve which has a valve member movable in response to the conformations of the pattern, has two portions, one portion of which controls a contouring hydraulic motor and the other portion of which controls a traversing motor as in 180 degree tracer valves. The two motors are connected, respectively, to slides which are movable in parallel planes transversely relative to each other, one of said slides reversibly movable in one direction and the other reversibly movable in another direction to permit two dimensional universal relative movement between the portion of the machine carrying the cutter and the tracer mechanism and the portion of the machine carrying the workpiece and the pattern. Like 180 degree valves the portion controlling the contouring motor constitutes a reversing valve so that the contouring motor can be stopped when the valve member is in a null position, and can be driven in one direction or the other as the valve member is moved to one side or the other of the null position in response to movement of the tracer mechanism follower engaged with the pattern. In the valve utilized in the preferred embodiment of the present invention the valve portion controlling the traversing motor serves to connect one side of that motor to the main pressure source when the valve member is in the null position and to connect that side of the motor to exhaust when the valve member has been moved beyond predetermined positions in either direction from the null position. A second source of pressure at a level below the main pressure source is connected to the other side of the traversing motor and that side of the motor is also connected to exhaust through a relief valve set to maintain pressure of the second source on that side of the motor.

Thus, when the valve member is in the null position and the contouring motor stopped, pressure from the main source is supplied through the valve to the one side of the traversing motor, and, since this pressure is greater than the pressure from the second source maintained on the other side of the motor, the traversing motor is driven in one direction. When the valve member is moved beyond the predetermined positions on either side of the null position, thus driving the contouring motor in one direction or the other, the one side of the traversing motor is connected to exhaust through the valve and the traversing motor is driven in the opposite direction by virtue of the pressure from the second source maintained on the other side of the motor. Since both motors are capable of being driven in two directions in response to movement of the valve member, which is moved by the follower in response to conformations of the pattern, it is evident that profiling through an angle greater than 180 degrees can be achieved.

It is therefore an object of the present invention to provide a simple hydraulic system to effect two dimension tracing of more than 180 degrees but less than 360 degrees for a pattern controlled machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 2 is a cross-sectional view of the tracer mechanism;

Figs. 4a, 4b, 4c, and 4d are cross-sectional views of the tracer valve when the valve member is in the lower blocking position, when beyond, or below, the lower blocking position, when in the upper blocking position, and when beyond, or above, the upper blocking position, respectively.

Figure 5:
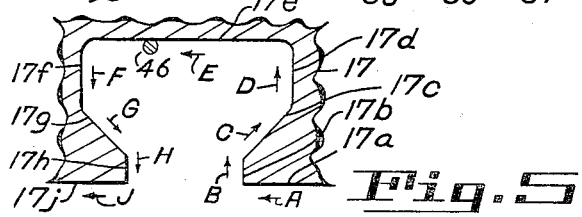

Fig. 5 is a schematic plan view of the pattern and the follower engaged therewith; and Fig. 6 is a cross-sectional view of a modified tracer valve.

Figure 1:
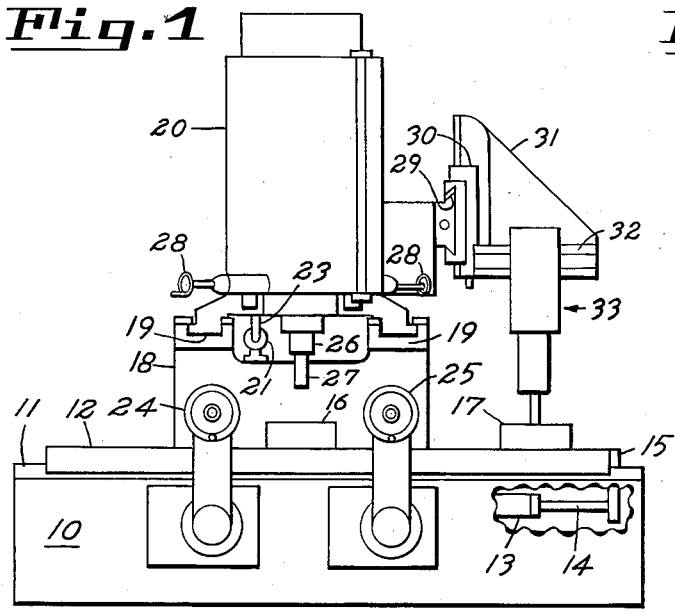
Fig. 1 is a front elevational view of a machine tool in which the hydraulic system of the present invention is incorporated.

The present invention is shown in conjunction with a vertical milling machine having a pattern controlled profile tracer mechanism, but it will be understood that the present invention may be used in other pattern controlled machines. As shown in Fig. 1, the machine has a bed 10 having ways 11 upon which is carried a table 12 for reciprocating longitudinal, or traversing, movement. This movement is imparted to the table by a traversing hydraulic motor 13 mounted in the bed. The hydraulic motor 13, which is of the cylinder type, has a piston 34 and piston rods 14 connected to each side of the piston which are connected to the table by brackets 15 extending between ways 11. The table 12 is adapted to receive a workpiece 16 and a pattern 17.

The bed 10 has a column 18 rising therefrom having ways 19. A ram 20 is slidably mounted on the ways 19 for reciprocating cross, or contouring, movement. This movement is imparted to the ram 20 by a contouring hydraulic motor 21 mounted on the column 18. The motor 21, which is also of the cylinder type, has a piston 35 with piston rods 22 connected to each side thereof which are connected to the ram 20 by brackets 23. Manual control of the longitudinal and cross movement of the table and ram, respectively, is effected by hand wheels 24 and 25. The ram has a rotatable spindle 26 carrying the cutter, or tool, 27, the vertical feed of the spindle being controlled by either hand wheel 28.

The ram 20 has cross ways 29 upon which is adjustably secured a slide 30 in which the bracket 31 is received for vertical adjustment relative thereto. The bracket 31 has longitudinal ways 32 to which the tracer mechanism 33 is adjustably secured. The tracer mechanism 33 is thereby universally adjustable for registration with the pattern 17 on the table 12.

As shown in Fig. 2, the tracer mechanism 33 has a cylindrical housing 40. Received in the lower end of the housing is a sleeve 41 having an enlarged portion 42 at its lower end. A cap 43 is received in portion 42 of the sleeve, and the head of the cap is bolted thereto by bolts 44. Set screws (not shown) are threadedly received in the upper end of portion 42 to engage the lower surface of housing 40 and bolts 45 extending through the head of cap 43 and portion 42 secure the sleeve 41 adjustably in the housing. The tracer member 46 with finger 47 secured therein by set screw 48 defines a follower adapted to engage the pattern. The tracer member has a flange 49 which seats on the upper surface of cap 43, the flange having an annular recess 50 in its lower surface. Balls 51 are circumferentially spaced about the tracer member and are held in a ball retainer ring 52 having a head 53 received in the recess 50 and supported on the upper surface of cap 43. The balls 51 are in contact with the inner wall of cap 43 and the periphery of the tracer member, and define a pivot for that member about which it may tilt in response to contact of the finger 47 with the pattern.

A tracer valve 56 is received in the housing 40 above the tracer member 46 and comprises a bushing 57 snugly received in the housing and fixed relative thereto, and a valve member, or plunger, 58 slidably received in the bushing. The lower end of the valve plunger 58 and the upper portion of the tracer member 46 have conical recesses 59 and 60, respectively, in which a ball 61 is received. It will be evident that as the tracer member 46 is tilted, the valve plunger 58 will move axially upward an amount proportional to the tilt of member 46, the valve plunger being in its lowest position when the member 46 is vertical, in its neutral position, with the axis thereof in the position indicated at 46a. A spring 62 is interposed between the top of the valve plunger 58 and the top of the housing to urge the valve plunger downwardly, urging the tracer member 46 normally into its neutral position.

Figure 3:
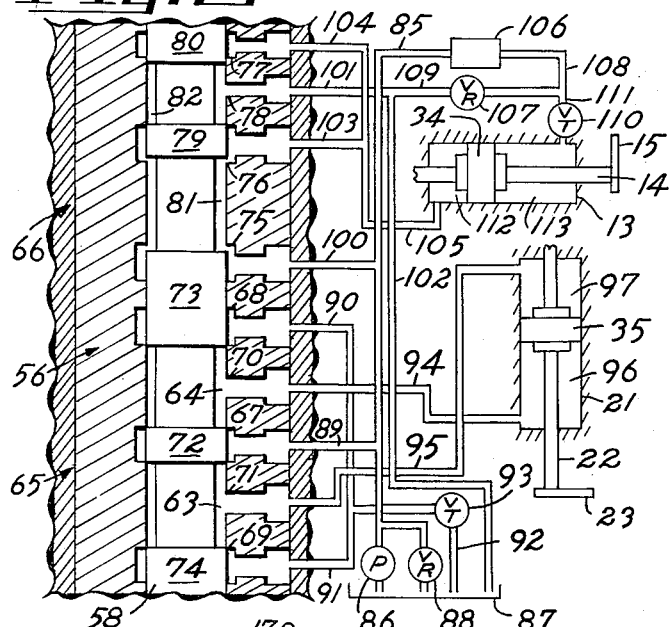
Fig. 3 is a schematic diagram of the hydraulic system of the present invention.

As shown in Fig. 3, valve 56 comprises two portions, a contouring portion 65 which controls operation of the contouring motor 21, and a traversing portion 66 which controls operation of the traversing motor 13. The contouring portion 65 has a pressure port 67, a pair of discharge ports 68 and 69 on each side thereof, and a pair of motor ports 70 and 71 between the pressure port and the respective discharge ports. Spaced spools 72, 73, and 74 carried on the valve plunger 58 are associated with ports 67, 68, and 69, respectively, and block these ports when the valve plunger is in a null position with the spool 72 in registration with the port 67, as shown in Fig. 3, which position the valve member assumes when the follower 46 is deflected a predetermined amount to a null position, with its axis in the position indicated at 46b (see Fig. 2). The spool 72 is substantially the same width as the port 67 and when the spool is moved upwardly the port 67 is connected to motor port 71 by means of the annular channel 63 formed by the valve member between the spools 72 and 74. When the valve plunger is moved downwardly the pressure port 67 is connected to the other motor port 70 by means of annular channel 64 between the spools 72 and 73. When the valve plunger is moved in either direction the motor port 70 or 71 not connected to the pressure port 67 is connected to one of the discharge ports 68 or 69.

Figure 4A:
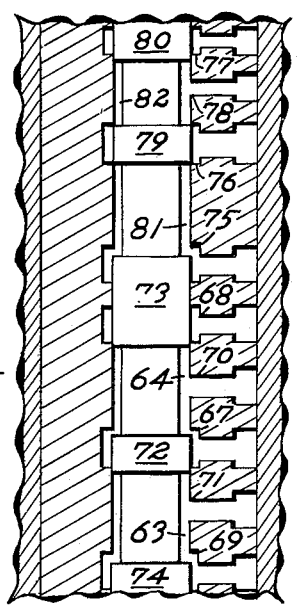
Figure 4B:
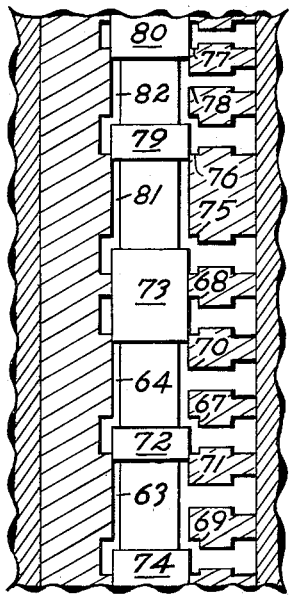

The traversing portion 66 of the valve has a pressure port 75, a pair of motor ports 76 and 77 on one side thereof, and a discharge port 78 between the motor ports. The upper portion of spool 73 is associated with pressure port 75 while spaced spools 79 and 80 are associated with motor ports 76 and 77, respectively. The spools are positioned so that when the valve member 58 is in the null position the spool 79 and the upper end of spool 73 straddle at least a portion of ports 76 and 75, respectively, with the upper shoulder of spool 73 lying below the upper edge of port 75, and the lower shoulder of spool 79 lying above the lower edge of port 76. When the valve member is in this position, pressure from port 75 is supplied to motor port 76 through the annular channel 81 formed between the spools 73 and 79, and motor port 77 is blocked by spool 80. When the valve member 58 is moved downwardly from the null position to a lower blocking position, shown in Figure 4a, spool 79 blocks the port 76. The valve members 58 will assume its lower blocking position when the follower 46 is underdeflected, or moved from its null position toward its neutral position, a predetermined amount to a blocking position where its axis is in the position indicated by 46c (see Fig. 2). The spool 79 is substantially the same width as port 76 and when the valve member 58 is moved below the lower blocking position, as shown in Figure 4b, in response to further movement of the follower towards its neutral position, motor port 76 is connected to discharge port 78 through annular channel 82 formed between the spools 79 and 80.

When the valve member 58 is moved upwardly from the null position to an upper blocking position, shown in Fig. 4c, the upper shoulder of spool 73 is in registration with the upper edge of port 75 and that port is blocked. The valve member 58 will assume its upper blocking position when the follower 46 is overdeflected, or moved from its null position away from its neutral position, a predetermined amount to a blocking position where its axis is in the position indicated by 46d (see Fig. 2). In this position the lower edge of spool 80 is in registration with the lower edge of port 77. However, when the valve member is moved upwardly beyond the upper blocking position, in response to further movement of the follower away from its neutral position, motor port 77 is connected by annular channel 82 to discharge port 78.

As shown in Fig. 3 pressure line 85 is connected to pump 86 which receives fluid from sump 87. Relief valve 88 connected to line 85 and discharging to sump 87 establishes a predetermined pressure in line 85. Branch pressure line 89 connects pressure port 67 in the contour portion 65 of valve 56 to pressure line 85. Branch discharge lines 90 and 91 connect discharge ports 68 and 69, respectively, to discharge line 92 having a throttle valve 93 therein and leading to the sump 87. Motor ports 70 and 71 are connected, respectively, to opposite ends of motor 21 through lines 94 and 95. Thus, when valve member 58 is moved below the null position, pressure is supplied through line 85, line 89, port 67, annular channel 64, port 70, and line 94 to the chamber 96 on one side of the piston 35 in motor 21. Exhaust from the chamber 97 on the other side of piston 35 passes through line 95, port 71, annular channel 63, port 69, line 91, and line 92 to sump 87. When the valve member 58 is moved above the null position, pressure is supplied from line 85 through line 89, port 67, channel 63, port 71, and line 95 to chamber 97; and discharge from chamber 96 occurs through line 94, port 70, channel 64, port 68, line 90, and line 92 to sump 87.

The pressure port 75 of the traversing portion 66, of valve 56, is connected by branch line 100 to pressure line 85, and discharge port 78 is connected by branch line 101 to discharge line 102 leading to the sump. Motor ports 76 and 77 are connected by branch lines 103 and 104, respectively, to line 105 leading to one side of motor 13. A source of reduced pressure is established between a pressure reducing valve 106 having one side connected to pressure line 85, and a relief valve 107 connected to the other side of the reducing valve 106 by line 108. The relief valve 107 discharges through line 109 to discharge line 102. The other side of motor 13 is connected to this source of reduced pressure in line 108 through the throttle valve 110 by line 111.

When the valve member 58 is in the null position of Fig. 3 the full pressure of line 85 is supplied through port 75, annular channel 81, port 76, line 103, and line 105 to chamber 112 on one side of the piston 34 in the motor 13. The chamber 113 on the other side of piston 34 is always connected to the source of reduced pressure in line 108, but since this pressure is less than the pressure supplied to chamber 112, the motor will operate to move the table 12 to the right as viewed in Fig. 1. The discharge from chamber 113 passes through line 111, throttle valve 110, into line 108, and through the relief valve 107 and line 109 to discharge line 102. As the valve member 58 is moved down towards its lower blocking position the speed of motor 13 will decrease, and when the valve member reaches the lower blocking position, as shown in Fig. 4a, the motor will be stopped since port 76 becomes blocked at that time and port 77 remains blocked, thus blocking all possible discharge paths from chamber 112. As the valve member 58 is moved down beyond the lower blocking position, as shown in Fig. 4b, a discharge path from chamber 112 is established through line 105, line 103, port 76, annular channel 82, port 78, and line 101 to discharge line 102. In this position of the valve member pressure from port 75 is isolated from the motor ports by spool 79. Thus, since chamber 113 is in communication with the source of reduced pressure and chamber 112 is connected to discharge, the motor will run in the opposite direction moving the table 12 to the left as viewed in Fig. 1.

A similar result occurs when the valve member 58 is moved up to and beyond the upper blocking position. When at the upper blocking position, shown in Fig. 4c, pressure port 75 is blocked by spool 73, and both motor ports 76 and 77 are isolated from discharge port 78. Motor 13 is therefore stopped. When the valve member 58 is moved beyond the upper blocking position, as shown in Fig. 4d, motor port 77 is opened, and a discharge path is established from chamber 112 through line 105, line 104, port 77, annular channel 82, discharge port 78, and line 101 to discharge line 102. Thus, again, the pressure in chamber 113 causes the motor to operate in a direction to move the table 12 to the left as shown in Fig. 1. It therefore will be seen that when the follower is deflected between the limits indicated at 46c and 46d the traversing motor will run in one direction and when the follower is deflected in either direction beyond these limits the traversing motor will run in the opposite direction.

In the operation of a machine tool embodying the present invention the cutter 27 is lowered an amount to correspond to the desired depth of the cut on the workpiece 16, and the cutter 27 and follower 46 are brought into engagement with workpiece 16 and pattern 17, respectively, the follower engaging surface 17a of the pattern and being deflected to its null position (46b) to move the valve member to its null position shown in Fig. 3. When the valve member is in the null position the contouring motor 21 is stopped, and the traversing motor 13 moves the table 12 to the right, the full pressure introduced into chamber 112 exceeding the intermediate pressure maintained in chamber 113. This causes relative movement of the cutter and follower to the left in relation to the workpiece and pattern as shown by arrow A in Fig. 5. When the follower reaches surface 17b the follower will drop to the position indicated by 46c and the valve member will be moved to the lower blocking position (see Fig. 4a) where the traversing motor is stopped, and the contouring motor moves the ram 20, and hence the cutter and follower, in the direction of arrow B on Fig. 5 relative to the workpiece and pattern. When the follower reaches surface 17c it will drop further toward the neutral position and the valve member will drop below its lower blocking position to a position such as shown in Fig. 4b and chamber 112 will be connected to discharge through the valve portion 66. Thus, the table will be moved to the left, as viewed in Fig. 1, causing relative movement of the tool and follower to the right relative to the workpiece and pattern. At this time, it will be noted, the contouring motor 21 is not stopped but continues operation in the same direction as when moving along surface 17b of the pattern so that the resultant movement of the tool and follower relative to the workpiece and pattern will be as shown by arrow C in Fig. 5.

When the follower reaches surface 17d of the pattern it is deflected until it again assumes the position indicated at 46c to move the valve member 58 upward to the lower blocking position (see Fig. 4a) and, with the traversing motor consequently stopped, the follower moves in a path as indicated by arrow D. When contact is made by the follower with surface 17e the follower is deflected further to move the valve member upwardly to the null position as shown in Fig. 3. This duplicates the condition existing when the follower was moving along surface 17a, and the follower moves as indicated by arrow E. When the surface 17f is contacted the follower is deflected further to the position indicated at 46d, and the valve member is moved upward to the upper blocking position shown in Fig. 4c. Again the traversing motor is stopped, and the contouring motor is driven in the opposite direction to that direction in which it was driven when the valve member was in the lower blocking position, so the follower and cutter move relative to the workpiece and pattern as shown by arrow F. When the surface 17g of the pattern is contacted the follower is further deflected to move the valve member above the upper blocking position, as shown in Fig. 4d, and again the chamber 112 is connected to exhaust through the valve portion 66. This again moves the table 12 to the left, by virtue of the intermediate pressure in chamber 113, moving the follower to the right in relation to the pattern. Since, however, the contouring motor 21 continues to run in the same direction as when in the upper blocking position, the resultant movement of the follower relative to the pattern is as shown by arrow G.

At surface 17h the follower becomes less deflected, and the valve member drops to the upper blocking position (see Fig. 4c), and the movement of the follower is as shown by arrow H. At surface 17j the follower is even less deflected, and the valve member drops to the null position to duplicate the condition as at surface 17a, and the follower and tool move relative to the pattern and workpiece as shown by arrow J. It will be noted that the relative movement between the follower 46 and the pattern 17, as shown by arrows C, D, E, F, and G, and the corresponding relative movement between the cutter 27 and the workpiece 16, constitutes relative movement in a plane through an angle greater than 180 degrees but less than 360 degrees.

In a typical system constructed in accordance with the present invention relief valve 88 may be set to maintain a pressure of 500 p.s.i. in line 85, reducing valve 106 may be set to drop the pressure 250 p.s.i., and relief valve 107 may be set to maintain a pressure of 250 p.s.i. in line 108. The pressure at the sump may be zero, or, a slight back pressure in the system may be maintained by insertion of a relief valve in line 102 at the sump to maintain a relatively low pressure of say 5 p.s.i. in line 102 at the sump.

In the hydraulic system of the present invention a tracer valve of other construction may be used, such as the valve shown in Fig. 6. In this valve, designated 156, the portion 165 controls the contouring motor in the same manner as the portion 65 of valve 56, and will not be described further. The portion 166, which controls the traversing motor 13, has a motor port 177, a pair of discharge ports 175 and 178 on one side thereof, and a pressure port 176 between the discharge ports. Spools 173, 179, and 180 are associated, respectively, with discharge port 175, pressure port 176, and motor port 177, the latter spool being substantially the same width as port 177. The spools are positioned and spaced so that when valve member 158 is in the null position, as shown in Fig. 6, spool 173 blocks the discharge port 175 while spools 179 and 180 are displaced relative to ports 176 and 177, with the far shoulders thereof lying inside the far edges of the ports, the lower shoulder of 179 being above the lower edge of port 176, and the upper shoulder of spool 180 being below the upper edge of port 177. The valve member 158 has a channel 168 extending therethrough terminating at openings 169 and 170 beyond the far shoulders of spools 179 and 180, the opening 169 lying below the spool 179 and the opening 170 lying above the spool 180. Thus, in the null position, the pressure port 176 and motor port 177 are connected through channel 168 to drive the motor 13 and move the table 12 to the right, as viewed in Fig. 1, against the intermediate pressure maintained in chamber 113 of motor 13. When the valve member 158 is moved downwardly to a lower blocking position where the lower shoulder of spool 179 is in registration with the lower edge of pressure port 176, that port is blocked and motor 13 is stopped, since at this time motor port 177 is isolated from both discharge ports. When the valve member 158 is moved below the lower blocking position the pressure port 176 remains blocked, but motor port 177 is connected to discharge port 175 through the channel 168. Thus the table 12 is moved to the left by the motor 13.

Similarly when the valve member 158 is moved above the null position to an upper blocking position where the spool 180 is in registration with motor port 177, motor 13 is stopped, since the motor port is blocked. When the valve member 158 is moved above the upper blocking position, however, the motor port is isolated from pressure port 176 but is connected to the other discharge port 178 through annular channel 182. Thus, again, the motor is driven by virtue of the pressure in chamber 113 to move the table 12 to the left as viewed in Fig. 1.

In the preferred embodiment of the invention the chamber 112 is connected to discharge through valve portion 66 (and 166) upon any movement of the valve member beyond its blocking positions. It will be understood that the passage from chamber 112 may however begin to open only after some movement of the valve member beyond the blocking positions, or may begin to open shortly before the blocking position is reached, without departing from the spirit of this invention.

In an actual valve construction the ports may be opened considerably less than indicated in the drawings during operation, the drawings having exaggerated the movement of the valve member for clarity.

What is claimed is:

1. A hydraulic system for controlling relative reversible movement in one direction between a cutting tool and a workpiece in a machine tool operable to reproduce the contour of a pattern on the workpiece in a plane through an angle more than 180 degrees therearound but less than 360 degrees comprising in combination a movable follower adapted to engage the pattern, a source of pressure, a hydraulic motor for effecting said relative movement between the cutting tool and the workpiece, means to maintain pressure at a level below the level of pressure of said source on one side of said motor, means to connect the other side of the motor to the source of pressure when the follower is in a predetermined position, and means responsive to the movement of the follower to disconnect said other side of the motor from the source of pressure and connect said other side of the motor to discharge as the follower is moved to a position spaced from said predetermined position.

2. In a machine tool hydraulic system operable to control relative movement between a cutting tool and a workpiece in a plane through more than 180 degrees but less than 360 degrees in accordance with the contour of a pattern, the combination of a hydraulic motor for effecting relative movement between the cutting tool and the workpiece in one direction, a follower adapted to engage the pattern and movable in response to conformations thereof, a source of fluid at a first predetermined pressure, a source of fluid at a second predetermined pressure below said first predetermined pressure, means to connect the source of fluid at said second pressure to one side of the motor, and means including a valve responsive to the movement of the follower to connect the other side of the motor to the source of fluid at said first predetermined pressure when the movement of the follower is within predetermined limits and to connect said other side of the motor to discharge when the follower is moved toward positions beyond said predetermined limits.

3. In a machine tool hydraulic system for controlling relative movement between a cutting tool and a workpiece in a plane through more than 180 degrees but less than 360 degrees in accordance with a pattern, said system having a follower engaged with the pattern and having means to effect relative movement between the cutting tool and the workpiece in one direction in said plane, said movement reversing as the follower is deflected through a predetermined position, the combination of a valve, a pressure line connected to the valve, a hydraulic motor for effecting relative movement between the cutting tool and workpiece in another direction in said plane, means to maintain a predetermined pressure below the pressure in the pressure line on one side of the motor, means for discharge of fluid above said predetermined pressure from said one side of the motor, a valve member within the valve operatively connected to the follower and operable to connect the other side of the motor to the pressure line when the follower is deflected between two predetermined limits, one on each side of said predetermined position, said valve member operable to connect the other side of the motor to discharge when the follower is deflected beyond said predetermined limits.

4. In a machine tool having a cutting tool movable in a plane in cutting engagement relative to a work-piece through more than 180 degrees but less than 360 degrees in accordance with a pattern, a hydraulic circuit for effecting relative reversible movement in one direction between the cutting tool and the work-piece comprising in combination a follower movable relative to the pattern and adapted to engage the pattern for deflection thereby, a tracer valve, a hydraulic motor, a sump to receive fluid at a relatively low pressure, a pressure reducing valve, a source of fluid under pressure, means defining a passage from the tracer valve to one side of the motor, means defining a passage from the tracer valve to the sump, means defining a passage from the pressure source to the tracer valve, means defining a passage from the pressure source through the pressure reducing valve to the other side of the motor, means defining a passage from the other side of the motor to the sump and having means therein to maintain a predetermined pressure on said side of the motor above the pressure at the sump, and a valve plunger slidably received in the tracer valve and operatively connected to the follower for movement in response to deflection thereof, the valve plunger having means carried thereon to effect connection of the passage to the tracer valve from the pressure source to the passage from the tracer valve to said one side of the motor and to disconnect the passage from the tracer valve to said one side of the motor from the passage from the tracer valve to the sump when the valve plunger is between two predetermined positions, and to disconnect the passage to the tracer valve from the pressure source from the passage from the tracer valve to said one side of the motor and to effect the connection of the passage from the tracer valve to said one side of the motor to the passage from the tracer valve to the sump when the valve plunger is beyond said predetermined positions.

5. In a machine tool having a cutting tool movable in a plane in cutting engagement relative to a work-piece through more than 180 degrees but less than 360 degrees in accordance with a pattern, a hydraulic circuit for effecting relative reversible movement in one direction between the cutting tool and the work-piece comprising in combination: a follower movable with the cutting tool and relative to the pattern and adapted to engage the pattern for deflection thereby; a hydraulic motor; a sump; a pressure reducing valve; a relief valve; a source of pressure; a tracer valve having a pressure port connected to the source of pressure, a pair of motor ports on one side of the pressure port connected to one side of the motor, and a discharge port between the motor ports connected to the sump; means defining a passage from the other side of the motor through the relief valve to the sump; means defining a passage from the source of pressure through the pressure reducing valve to the other side of the motor; and a valve plunger slidably received in the tracer valve and operatively connected to the follower for movement in response to deflection thereof, the valve plunger having a spool associated with one of the motor ports of substantially the same width as said motor port and spools associated with the pressure port and the other motor port on each side thereof respectively, the spools associated with the pressure port and said one motor port, respectively, spaced to straddle at least a portion of said ports to connect said one side of the motor to the source of pressure and the spool associated with the other motor port spaced to block said port to disconnect said one side of the motor from the sump when the valve plunger is between two predetermined positions, the spool associated with the pressure port blocking said port to disconnect said one side of the motor from the source of pressure and the spool associated with the other motor port opening said port to connect said one side of the motor to the sump when the valve plunger is moved in one direction beyond one of said predetermined positions, and the spool associated with said one motor port isolating said port from the pressure port to disconnect said one side of the motor from the source of pressure and effecting communication between said one motor port and the discharge port to connect said one side of the motor to the sump when the valve plunger is moved in the opposite direction beyond said other predetermined position.

6. In a machine tool having a cutting tool movable in a plane in cutting engagement relative to a work-piece through more than 180 degrees but less than 360 degrees in accordance with a pattern, a hydraulic circuit for effecting relative reversible movement in one direction between the cutting tool and the work-piece comprising in combination: a follower movable with the cutting tool and relative to the pattern and adapted to engage the pattern for deflection thereby; a hydraulic motor; a sump; a pressure reducing valve; a relief valve; a source of pressure; a tracer valve having a pressure port connected to the source of pressure, a pair of discharge ports connected to the sump on either side of the pressure port, and a motor port on the other side of one of said discharge ports connected to one side of the motor; means defining a passage from the other side of the motor through the relief valve to the sump; means defining a passage from the source of pressure through the pressure reducing valve to the other side of the motor; and a valve plunger slidably received in the tracer valve and operatively connected to the follower for movement in response to deflection thereof, the valve plunger having a spool associated with the motor port and of substantially the same width as said motor port, a spool associated with the pressure port, and a spool associated with the other of said discharge ports, the valve plunger having a passage therethrough with openings beyond the spools associated with the pressure port and the motor port, the spools associated with the pressure port and motor port being spaced with their far shoulders inside the far edges of said ports to connect said one side of the motor to the source of pressure and the spool associated with the other discharge port being spaced to block said port to disconnect said one side of the motor from the sump when the valve plunger is between two predetermined positions, the spool associated with the pressure port isolating said port to disconnect said one side of the motor from the source of pressure and the spool associated with said other discharge port opening said port to connect said one side of the motor to the sump when the valve plunger is moved in one direction beyond one of said predetermined positions, and the spool associated with the motor port isolating said port from the valve plunger passage opening beyond said spool to disconnect said one side of the motor from the source of pressure and connecting said port to said one discharge port to connect said one side of the motor to the sump when the valve plunger is moved in the opposite direction beyond said other predetermined position.

7. A hydraulic system in a pattern controlled machine tool operable to control movement of two machine members in different directions for effecting relative cutting movement in a plane through an angle greater than 180 degrees but less than 360 degrees between a cutting tool and a workpiece comprising a follower movable relative to the pattern, said follower normally urged to a neutral position and adapted to engage the pattern for deflection from said neutral position in accordance with conformations of the pattern, a first hydraulic motor, means connecting said first motor to one of said machine members, a second hydraulic motor, means connecting said second motor to the other of said machine members, a tracer valve having a first and second portion and a single valve member received in both of said valve portions, said valve member mechanically connected to the follower and movable in response to deflection thereof, the first portion of the tracer valve hydraulically connected to said first motor and the second portion thereof hydraulically connected to said second motor, means including said first valve portion to stop the first motor when the follower is deflected to a predetermined position, means including said second valve portion to run the second motor in one direction when the follower is in said predetermined position, means including said first valve portion to run the first motor in one direction when the follower is deflected in one direction from said predetermined position, means including said first valve portion to run the first motor in the opposite direction when the follower is deflected in the opposite direction from said predetermined position, means including said second valve portion to stop the second motor when the follower is deflected in either direction a predetermined amount from said predetermined position, and means including said second valve portion to run the second motor in the opposite direction when the follower is deflected more than said predetermined amounts from said predetermined position.

8. In a pattern controlled machine tool having two members movable in different directions for effecting relative movement between a cutting tool and a workpiece in a plane, a hydraulic system operable to control relative movement between the cutting tool and the workpiece through more than 180 degrees but less than 360 degrees in said plane comprising a follower mounted for movement relative to the pattern, said follower adapted to engage the pattern for deflection in accordance with the conformations of the pattern, a source of pressure, a first hydraulic motor, means connecting said motor to one of said machine members, valve means in communication with the source of pressure and responsive to the deflection of the follower to stop the first motor when the follower is in a predetermined position and to run said first motor in one direction when the follower is deflected in one direction from said predetermined position and to run said first motor in the opposite direction when the follower is deflected in the opposite direction from said predetermined position, a second hydraulic motor, means connecting said second motor to the other of said machine members, means to maintain a pressure above discharge pressure and below said predetermined pressure on one side of said second motor, and valve means responsive to the deflection of the follower to connect the other side of said second motor to the source of pressure when the follower is in said predetermined position and to connect said other side of the second motor to discharge when the follower is deflected to positions on either side of said predetermined position.

9. In a machine tool having a first member reversibly movable in one direction adapted to support a workpiece and a pattern and a second member reversibly movable in another direction adapted to carry a cutting tool, a hydraulic system operable to effect relative movement between the cutting tool and the workpiece in a plane through more than 180 degrees but less than 360 degrees comprising a follower mounted for movement with the cutting tool and relative to the pattern, said follower normally urged to a neutral position and adapted to engage the pattern for deflection from said neutral position in accordance with conformations of the pattern, a first hydraulic motor, means mechanically connecting said first hydraulic motor to one of said members, a valve, a source of pressure at a predetermined level in communication with the valve, a sump at a relatively low pressure in communication with the valve, means hydraulically connecting said first motor to the valve, a movable valve member slidably received in the valve and operatively connected to the follower, means on the valve member to block the first hydraulic motor when the follower is in a predetermined null position and connect one side of said motor to the source of pressure when the follower is deflected in one direction from said null position and to connect the other side of said motor to the source of pressure when the following is deflected in the other direction from said null position, a second hydraulic motor, means mechanically connecting said second motor to the other of said machine members, means hydraulically connecting one side of said second motor to the valve, means to maintain a pressure above sump pressure and below said predetermined pressure on the other side of said second motor, means defining a passage to the sump from said other side of said second motor for release of pressure above the pressure maintained thereon, means on the valve member to connect said one side of the second motor to the source of pressure at said predetermined level when the follower is in said null position and gradually to disconnect said predetermined pressure therefrom as the valve member is moved to predetermined blocking positions from the position assumed when the follower is in said null position, and means on the valve member gradually to connect said one side of the second motor to the sump as the valve member is moved beyond said blocking positions.

10. A hydraulic system in a pattern controlled machine tool operable to control movement of two machine members in different directions for effecting relative cutting movement in a plane through an angle greater than 180 degrees but less than 360 degrees between a cutting tool and a workpiece comprising a follower movable relative to the pattern, said follower normally urged to a neutral position and adapted to engage the pattern for deflection from said neutral position in accordance with conformations of the pattern, a first hydraulic motor, means connecting said first motor to one of said machine members, a second hydraulic motor, means connecting said second motor to the other of said machine members, a tracer valve having a first and second portion and a single valve member received in both of said valve portions, said valve member mechanically connected to the follower and movable in response to deflection thereof, the first portion of the tracer valve hydraulically connected to said first motor and the second portion thereof hydraulically connected to said second motor, means including said first valve portion to stop the first motor when the follower is deflected to a predetermined position, means including said first valve portion to run the first motor in one direction when the follower is deflected in one direction from said predetermined position, means including said first valve portion to run the first motor in the opposite direction when the follower is deflected in the opposite direction from said predetermined position, a source of fluid under pressure having a pressure line connected thereto, a source of fluid at a reduced pressure level connected to one side of said second motor, a discharge line to receive fluid at a pressure below said reduced pressure level, said pressure and discharge lines selectively connected to the other side of said second motor through the second portion of the tracer valve in response to movement of the valve member to run the second motor in one direction when the follower is in said predetermined position and to run the second motor in the opposite direction when the follower is deflected more than a predetermined amount in either direction from said predetermined position, and means on the valve member to block said other side of the second motor and stop said second motor when the follower is deflected in either direction said predetermined amount from said predetermined position.

References Cited in the file of this patent

UNITED STATES PATENTS

| | | |
|---|---|---|
| 2,332,533 | Roehm | Oct. 26, 1943 |
| 2,741,952 | Roehm | Apr. 17, 1956 |